US012756330B2

(12) United States Patent
Zhang et al.

(10) Patent No.: US 12,756,330 B2
(45) Date of Patent: Oct. 6, 2026

(54) POWER SUPPLY SYSTEM

(71) Applicant: Delta Electronics (Shanghai) Co., Ltd., Shanghai (CN)

(72) Inventors: Jinfa Zhang, Shanghai (CN); Litao Xia, Shanghai (CN); Yichao Wang, Shanghai (CN); Ang Zhang, Shanghai (CN); Kai Dong, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 18/980,898

(22) Filed: Dec. 13, 2024

(65) Prior Publication Data

US 2025/0202381 A1 Jun. 19, 2025

(30) Foreign Application Priority Data

Dec. 14, 2023 (CN) ......................... 202323421043.0

(51) Int. Cl.
*H02M 7/219* (2006.01)
*H02J 7/00* (2006.01)
(Continued)

(52) U.S. Cl.
CPC ............. *H02M 7/219* (2013.01); *H02J 7/855* (2026.01); *H02J 9/061* (2013.01); *H02M 1/14* (2013.01);
(Continued)

(58) Field of Classification Search
CPC .......... H02M 7/219; H02M 1/14; H02M 1/44; H02M 3/33573; H02M 3/33592;
(Continued)

(56) References Cited

U.S. PATENT DOCUMENTS

2020/0235656 A1* 7/2020 Forouzesh .......... H02M 1/4258
2021/0044208 A1* 2/2021 Li ..................... H02M 3/33584
(Continued)

FOREIGN PATENT DOCUMENTS

WO 2020108460 A1 6/2020

OTHER PUBLICATIONS

Yuliang Cao et al., A Scalable Electronic-Embedded Transformer, a New Concept Toward Ulta-High-Frequency High-Power Transformer in DC-DC Converters, IEEE Transactions on Power Electronics, vol. 38, No. 8, Aug. 2023, pp. 9278-9293.
(Continued)

*Primary Examiner* — Ryan Johnson
*Assistant Examiner* — Esayas G Yeshaw
(74) *Attorney, Agent, or Firm* — KIRTON McCONKIE; Evan R. Witt

(57) ABSTRACT

A power supply system for a data center includes an isolated AC-to-DC power conversion unit, an isolated DC-to-DC power conversion unit, an energy storage unit, a first DC bus and a second DC bus. The input terminal of the power supply system is connected with an AC power source. By the isolated DC-to-DC power conversion unit, a first DC voltage from the first DC bus is converted into a second DC voltage. The second DC voltage is provided to the second DC bus. The main power circuit in the isolated DC-to-DC power conversion unit is an LLC circuit or a boost-SRC circuit. The second DC voltage is between 0.5V and 60V. The energy storage unit is electrically connected with the first DC bus. When the isolated AC-to-DC power conversion unit works normally, the energy storage unit is charged to a floating charge state.

17 Claims, 15 Drawing Sheets

(51) Int. Cl.

| | |
|---|---|
| ***H02J 9/06*** | (2006.01) |
| ***H02M 1/14*** | (2006.01) |
| ***H02M 1/44*** | (2007.01) |
| ***H02M 3/335*** | (2006.01) |
| *H02J 101/22* | (2026.01) |
| *H02J 101/28* | (2026.01) |
| *H02J 101/30* | (2026.01) |
| *H02J 105/42* | (2026.01) |

(52) U.S. Cl.
CPC ......... *H02M 1/44* (2013.01); *H02M 3/33573* (2021.05); *H02M 3/33592* (2013.01); *H02J 2101/22* (2026.01); *H02J 2101/28* (2026.01); *H02J 2101/30* (2026.01); *H02J 2105/425* (2026.01)

(58) Field of Classification Search
CPC ...... H02J 7/0063; H02J 9/061; H02J 2300/22; H02J 2300/28; H02J 2300/30; H02J 2310/16
See application file for complete search history.

(56) References Cited

U.S. PATENT DOCUMENTS

| | | | | |
|---|---|---|---|---|
| 2022/0269325 | A1 | 8/2022 | Huang et al. | |
| 2022/0286055 | A1 * | 9/2022 | Baranwal .................. | H02J 7/06 |

OTHER PUBLICATIONS

Xin Wu et al., 10 kVac/270 Vdc Medium-voltage-Connecting Power Supply for Data Centers, 11th International Conference on Power Electronics-ECCE Asia, 2023, pp. 2512-2518.
Daniel Siemaszko et al., System Modelling and Reliability Study of the Tri-Port SST Featureing Energy Storage and Distributed Redundancy for Data Centers, IEEE, 2023, pp. 1-7.
Zhi Liu et al., Adaptive control strategy of solid state transformer with fast dynamic response and enhanced balance performance, IET Power Electronics, 2021, pp. 306-316.
Yi Longqiang, "Research on Architecture Performance and Optimization of Uninterruptible Power Supply System in Data Center," in Proceedings of 2023 China Power Electronics and Energy Conversion Conference (CPEEC2023) and the 26th China Power Supply Society Conference (CPSSC2023), 2023.

* cited by examiner

POWER SUPPLY SYSTEM

CROSS-REFERENCE TO RELATED APPLICATION

This application claims priority to China Patent Application No. 202323421043.0, filed on Dec. 14, 2023, the entire contents of which are incorporated herein by reference for all purposes.

FIELD OF THE INVENTION

The present disclosure relates to a power supply system, and more particularly to a power supply system for a data center.

BACKGROUND OF THE INVENTION

Data centers are global collaborative networks of specified devices that play an important role in accelerating the transmission, computing and storage of data information. As the scale of data centers continues to expand, the required power level continues to rise. Consequently, the requirements for the efficiency of the power supply systems of the data centers gradually increase in the market.

FIG. 1 is a schematic functional block diagram illustrating a conventional power supply system for a data center. As shown in FIG. 1, the data center power supply system 200 includes an AC-to-DC power conversion unit 210, a server power supply 220 and an energy storage unit 23.

An AC grid 11 or a power generator 12 can generate AC power with a medium voltage of at least 10 kV. The AC power is transmitted to the input terminal of the AC-to-DC power conversion unit 210 of the data center power supply system 200 through a transformer network 13. The AC power is converted into a first DC voltage Vdc1 by the AC-to-DC power conversion unit 210. The first DC voltage Vdc1 is provided to a first DC bus (bus1). The voltage value of the first DC voltage Vdc1 is about 240 V.

The server power supply 220 is usually equipped with a power factor correction (PFC) converter 221 and a first DC-to-DC converter 222. By the server power supply 220, the first DC voltage Vdc1 on the first DC bus1 is converted to a second DC voltage Vdc2 on a second DC bus (bus2). The voltage value of the second DC voltage Vdc2 is usually 12V, 48V or 54V based on the requirements of a load 40. Furthermore, a second DC-to-DC converter 30' is serially connected between the load 40 and the second DC bus (bus2) to provide the voltage reduction function and the voltage regulation function. When the AC power grid 11 or the power generator 12 is in a power down condition, the energy storage unit 23 connected to the server power supply 220 is enabled to provide electric power to the server power supply 220. Consequently, the server power supply 220 can work for a certain period so that data in the servers can be backup.

Since the server power supply 220 includes the PFC converter 221 and the first DC-to-DC converter 222, this two-stage circuit design reduces the overall power conversion efficiency. Since number of the power conversion stages of the data center power supply system directly affects the power efficiency and reliability, it is important to provide an improved system architecture of a data center power supply system with the reduced power conversion stages.

SUMMARY OF THE INVENTION

The present disclosure provides a power supply system for a data center. The power supply system is electrically connected with an AC voltage. Firstly, the AC voltage is converted into a first DC voltage by an isolated AC-to-DC power conversion unit. Then, the first DC voltage is converted into a second DC voltage by an isolated DC-to-DC power conversion unit having a relatively simple circuitry topology. Consequently, the conversion efficiency of the overall power supply system is improved.

In accordance with an aspect of the present disclosure, a power supply system is provided. The power supply system includes an isolated AC-to-DC power conversion unit, an isolated DC-to-DC power conversion unit and an energy storage unit. The isolated AC-to-DC power conversion unit converts a system input voltage into a first DC voltage. The first DC voltage is provided to a first DC bus. The isolated DC-to-DC power conversion unit is electrically connected with the isolated AC-to-DC power conversion unit through the first DC bus. The first DC voltage from the first DC bus is converted into a second DC voltage by the isolated DC-to-DC power conversion unit. The second DC voltage is provided to a load. A main power circuit in the isolated DC-to-DC power conversion unit is an LLC circuit or a boost-SRC circuit. A voltage value of the second DC voltage is between 0.5V and 60V. The energy storage unit includes a battery and is electrically connected with the first DC bus. When the isolated AC-to-DC power conversion unit works normally, the energy storage unit is charged to a floating charge state, and a voltage value of the first DC voltage is between 380V and 1500V.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
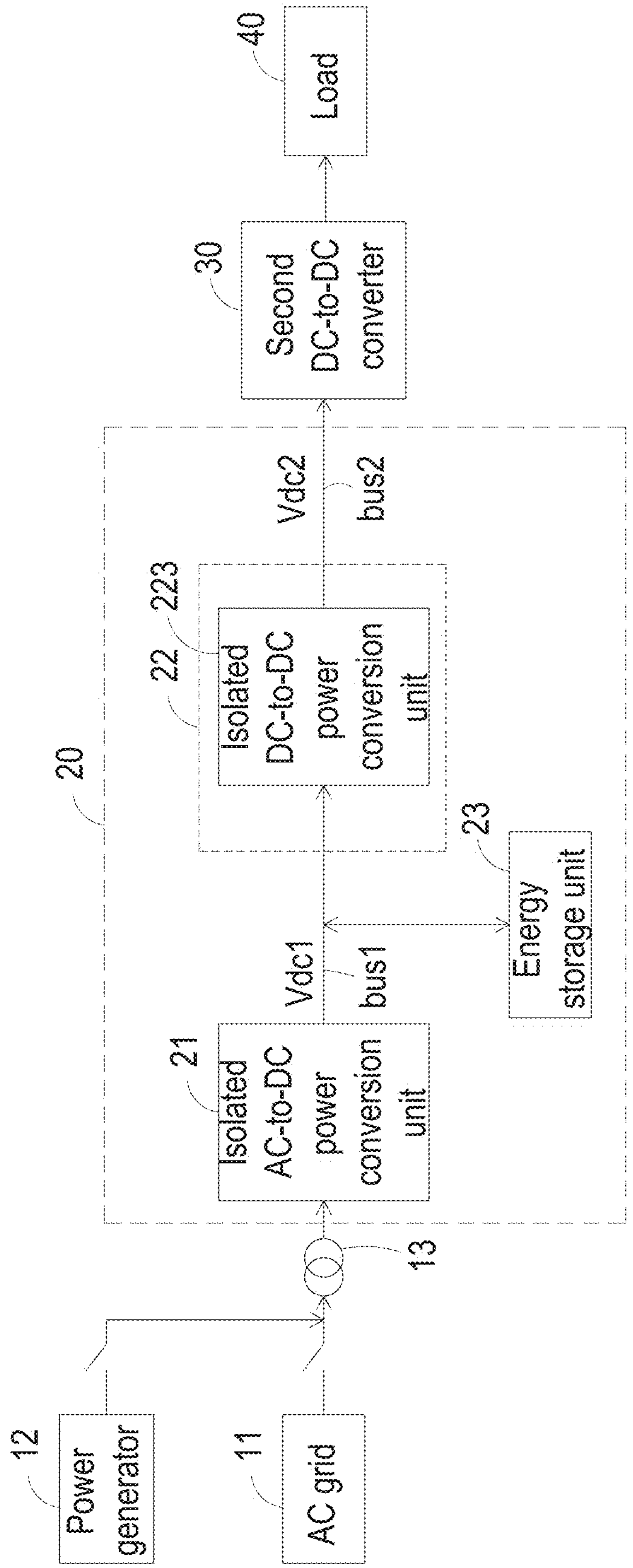
FIG. 2 is a schematic functional block diagram illustrating a power supply system for a data center according to a first embodiment of the present disclosure.

FIG. 2 is a schematic functional block diagram illustrating a power supply system for a data center according to a first embodiment of the present disclosure. In this embodiment, the data center power supply system 20 includes an isolated AC-to-DC power conversion unit 21, an isolated DC-to-DC power conversion unit 223 and an energy storage unit 23. The isolated DC-to-DC power conversion unit 223 is included in a server power supply 22.

An AC grid 11 or a power generator 12 can generate AC power with a medium voltage of at least 10 kV. By a transformer network 13, the AC power is converted into a system input voltage for the power supply system 20. The system input voltage is transmitted to the input terminal of the isolated AC-to-DC power conversion unit 21. The system input voltage is a medium AC voltage of at least 10 kV or a low AC voltage between 400 V and 690 V. By the isolated AC-to-DC power conversion unit 21, the system input voltage is converted into a first DC voltage Vdc1. The first DC voltage Vdc1 is provided to a first DC bus (bus1). In addition to the isolation function or the step-down rectification function, the isolated AC-to-DC power conversion unit 21 can also achieve the power factor correction function.

Figure 1:
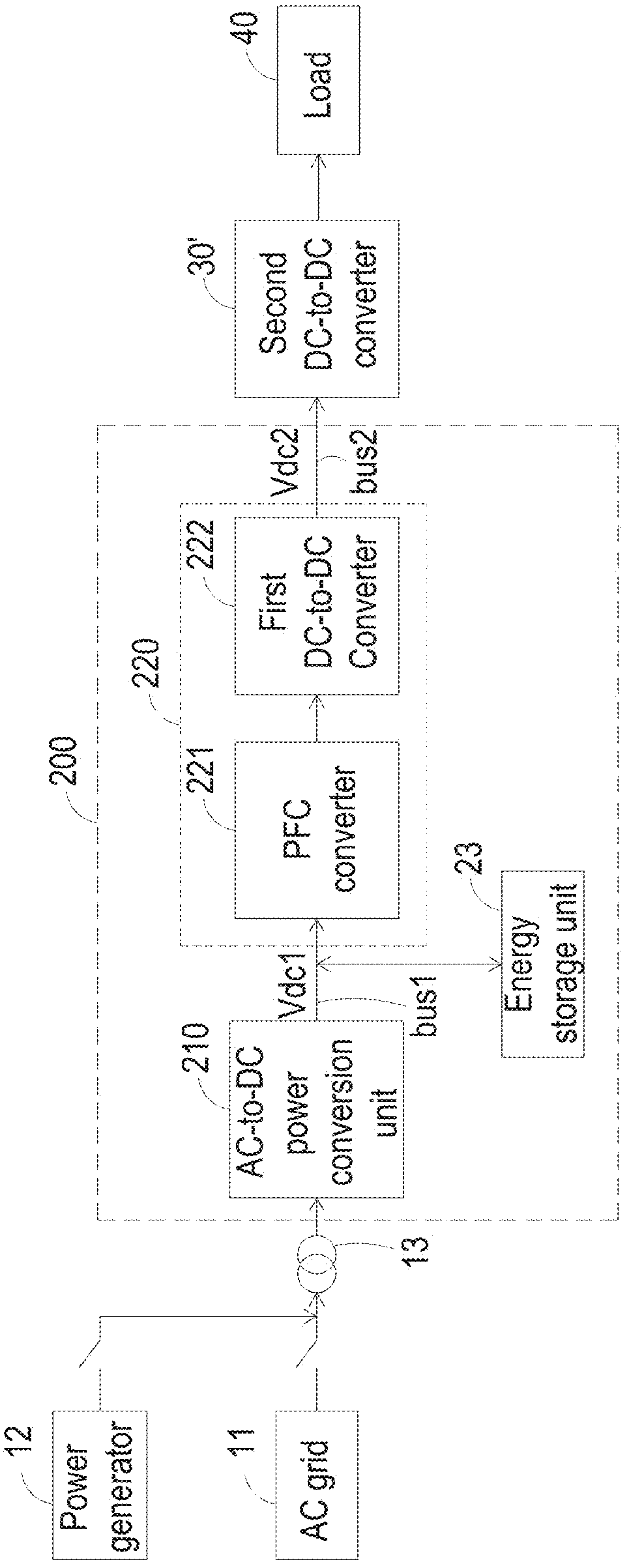
FIG. 1 PRIOR ART
FIG. 1 is a schematic functional block diagram illustrating a conventional power supply system for a data center.

As mentioned above, the conventional server power supply 220 shown in FIG. 1 includes a two-stage power conversion circuit including the PFC converter 221 and the first DC-to-DC converter 222.

In accordance with the present disclosure, the server power supply 22 shown in FIG. 2 only includes the isolated DC-to-DC power conversion unit 223 for implementing the step-down conversion and converting the first DC voltage Vdc1 into a second DC voltage Vdc2. The second DC voltage Vdc2 is in the range between 0.5V and 60V. In addition, the second DC voltage Vdc2 is provided to a second DC bus (bus2). When compared with the conventional power supply system 200, the power supply system 20 of the present disclosure is greatly simplified in the circuitry topology, and the construction cost of the data center is largely reduced. Furthermore, when compared with the conventional server power supply 220, the server power supply 22 of the present disclosure is greatly simplified in the circuitry topology, and the power conversion efficiency is largely improved. This is more important in the future market where a large number of server power supplies are required. Consequently, the power loss and waste can be largely reduced. Preferably, the voltage value of the second DC voltage Vdc2 is 0.6V~2V, 5V~12V or 50V~60V.

The energy storage unit 23 is electrically connected with the first DC bus (bus1) between the isolated AC-to-DC power conversion unit 21 and the isolated DC-to-DC power conversion unit 223 in the power supply system 20. For example, the energy storage unit 23 is a large energy storage system (ESS) having a battery for storing energy. In case that the isolated AC-to-DC power conversion unit 21 does not work normally, the energy storage unit 23 is enabled to provide an input voltage to the isolated DC-to-DC power conversion unit 223. Consequently, the voltage Vdc1 on the first DC bus (bus1) is prevented from dropping rapidly. In case that the isolated AC-to-DC power conversion unit 21 works normally, the energy storage unit 23 is charged to a floating charge state. Consequently, the voltage value of the first DC voltage Vdc1 is in the range between 380V and 1500V. In the floating charge state, the battery in the energy storage unit 23 is charged in a continuous, long-term and low-current mode, and thus the battery is continuously and fully charged. In an embodiment, the voltage value of the first DC voltage Vdc1 is between 800V and 1500V. In some other embodiments, the voltage value of the first DC voltage Vdc1 is 400V, 800V or 1200V. In an embodiment, the energy storage unit 23 is a supercapacitor.

When compared with the conventional power supply system 200 of FIG. 1, the server power supply 22 in the power supply system 20 of the present disclosure is not equipped with the PFC converter 221. Since one stage of power conversion unit is omitted, the overall power supply efficiency and reliability will be enhanced.

Optionally, if the load 40 is a component that needs a large current in a short time, for example a central processing unit (CPU), the power supply system 20 is additionally equipped with a second DC-to-DC converter 30. For example, the second DC-to-DC converter 30 is a point-of-load (POL) power supply or a voltage regulator module (VRM), which is known to those skilled in the art. The input terminal of the second DC-to-DC converter 30 is electrically connected with the output terminal of the isolated DC-to-DC power conversion unit 223. The output terminal of the second DC-to-DC converter 30 is electrically connected with the load 40 to provide the required voltage to the load 40, so that the load 40 can work in normal state. Generally, the required voltage for the load 40 is less than 1V.

Figure 3:
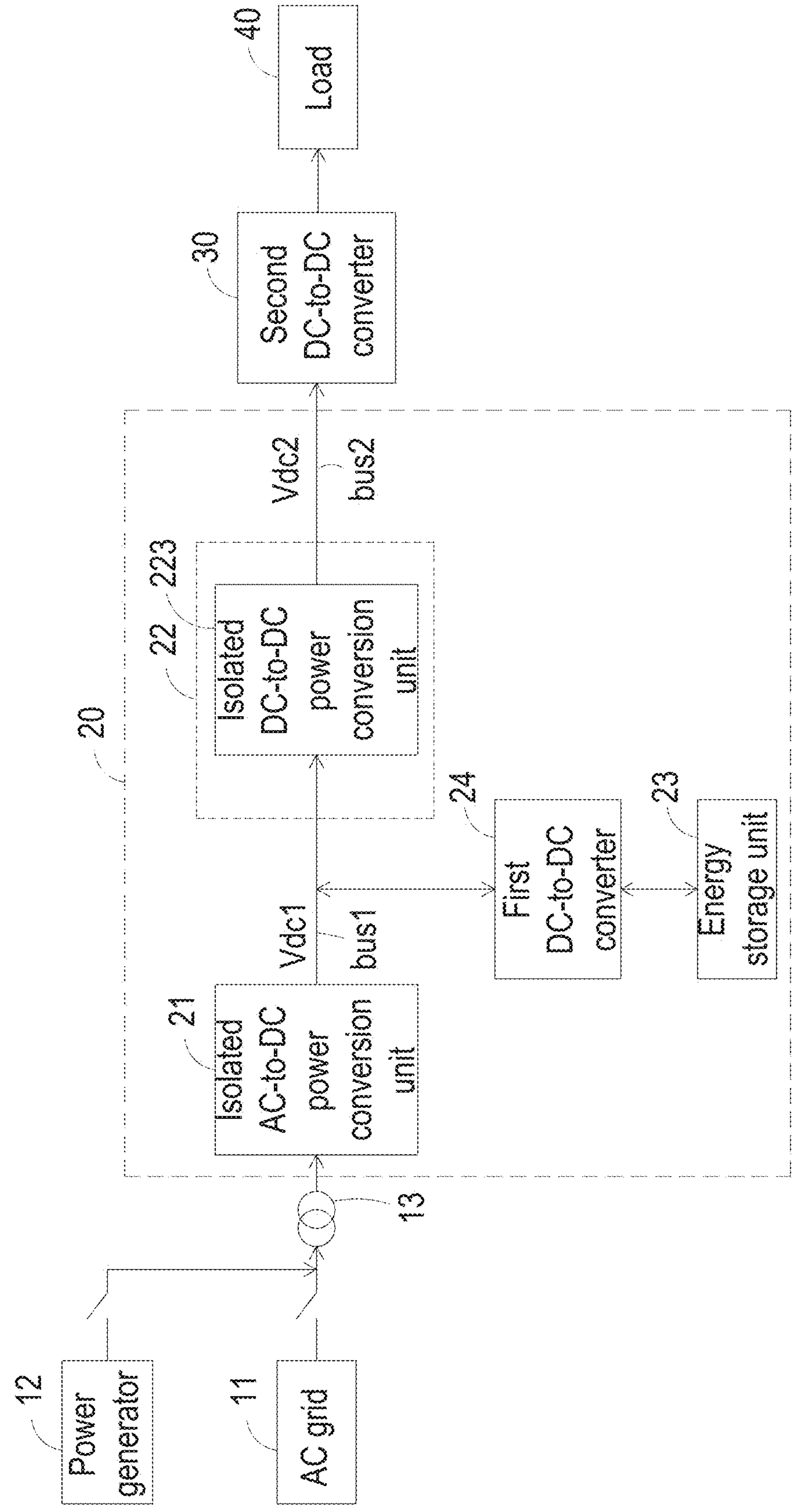
FIG. 3 is a schematic functional block diagram illustrating a power supply system for a data center according to a second embodiment of the present disclosure.

FIG. 3 is a schematic functional block diagram illustrating a power supply system for a data center according to a second embodiment of the present disclosure. Like the first embodiment, the power supply system 20 of this embodiment includes an isolated AC-to-DC power conversion unit 21, a server power supply 22 and an energy storage unit 23. Especially, the power supply system 20 of this embodiment further includes a first DC-to-DC converter 24. The first DC-to-DC converter 24 is connected between the first DC bus (bus1) and the energy storage unit 23 to perform voltage regulation or protection in the battery charging/discharging process.

Figure 4:
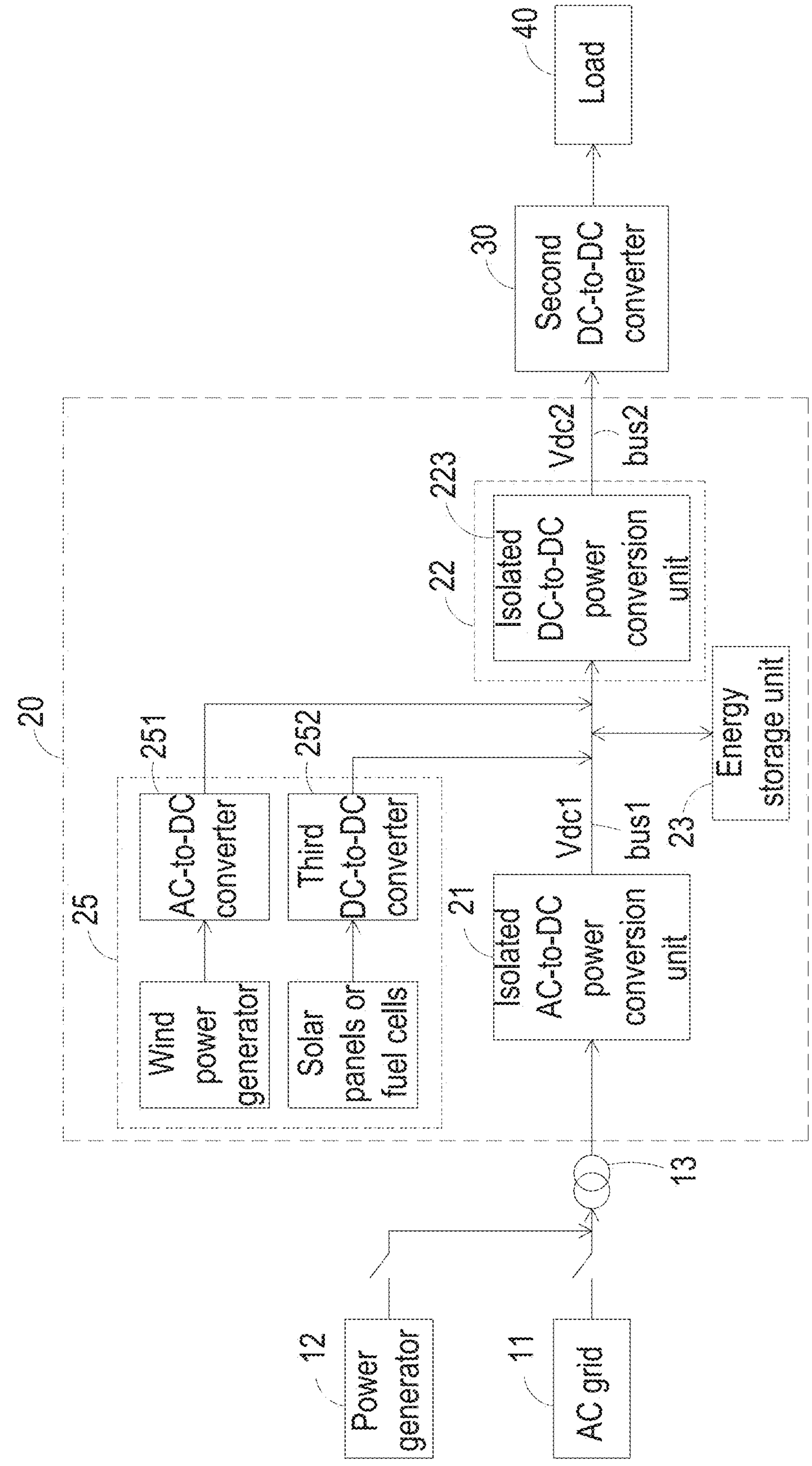
FIG. 4 is a schematic functional block diagram illustrating a power supply system for a data center according to a third embodiment of the present disclosure.

FIG. 4 is a schematic functional block diagram illustrating a power supply system for a data center according to a third embodiment of the present disclosure. With the widespread applications of new energy technologies, the first DC bus (bus1) in the power supply system 20 can be connected with the new energy power supply unit 25. For example, the new energy power supply unit 25 is used for providing at least one of wind power, solar power or fuel cell energy.

Please refer to FIG. 4 again. In comparison with the power supply system of the first embodiment, the power supply system 20 of this embodiment further includes the new energy power supply unit 25. The new energy power supply unit 25 includes at least one AC-to-DC converter 251 and at least one third DC-to-DC converter 252. The at least one AC-to-DC converter 251 and the at least one third DC-to-DC converter 252 are connected with the first DC bus (bus1). The at least one AC-to-DC converter 251 is connected with a wind power generator. The at least one third DC-to-DC converter 252 is connected with at least one of solar panels and fuel cells. That is, the solar panels or fuel cells are electrically connected with the first DC bus (bus 1) through the at least one third DC-to-DC converter 252. The third DC-to-DC converter 252 can provide a voltage step-up or voltage step-down function or a voltage stabilization protection function. The wind power generator is electrically connected with the first DC bus (bus 1) through the at least one AC-to-DC converter 251. Similarly, the AC-to-DC converter 251 can provide a voltage step-up or voltage step-down function or a voltage stabilization protection function.

Hereinafter, two examples of the circuitry topology of main power circuit in an isolated AC-to-DC power conversion unit of the power supply system will be illustrated with reference to FIG. 5 and FIG. 6.

Figure 5:
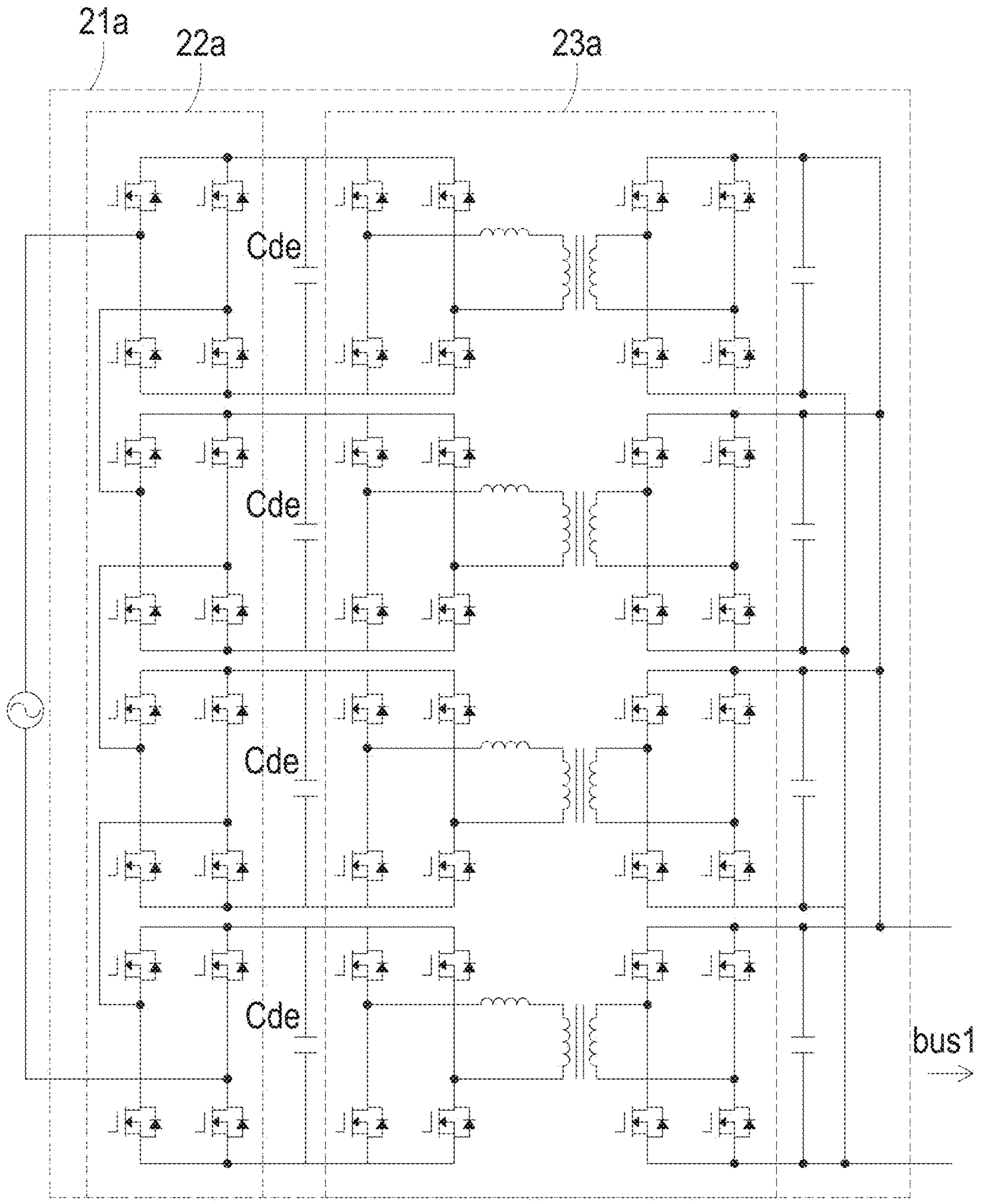
FIG. 5 is a schematic circuit diagram illustrating a first exemplary main power circuit in an isolated AC-to-DC power conversion unit of the power supply system.

FIG. 5 is a schematic circuit diagram illustrating a first exemplary main power circuit in an isolated AC-to-DC power conversion unit of the power supply system. As shown in FIG. 5, the main power circuit in the isolated AC-to-DC power conversion unit 21 has an isolated circuitry topology 21*a*. The isolated circuitry topology 21*a* includes a cascade H-bridge (CHB) rectifier circuit 22*a*, a plurality of DC decoupling capacitors Cde and an isolated voltage modulation circuit 23*a*. The isolated voltage modulation circuit 23*a* usually uses a topology to implement soft switching function of the switches, thereby achieving high efficiency. For example, the isolated voltage modulation circuit 23*a* has a dual active full-bridge circuit (DAB). The isolated AC-to-DC circuit is additionally equipped with the DC decoupling capacitors Cde to decouple the AC and DC power. In some embodiments, a modular multilevel converter (MMC) may also be used for rectification.

Figure 6:
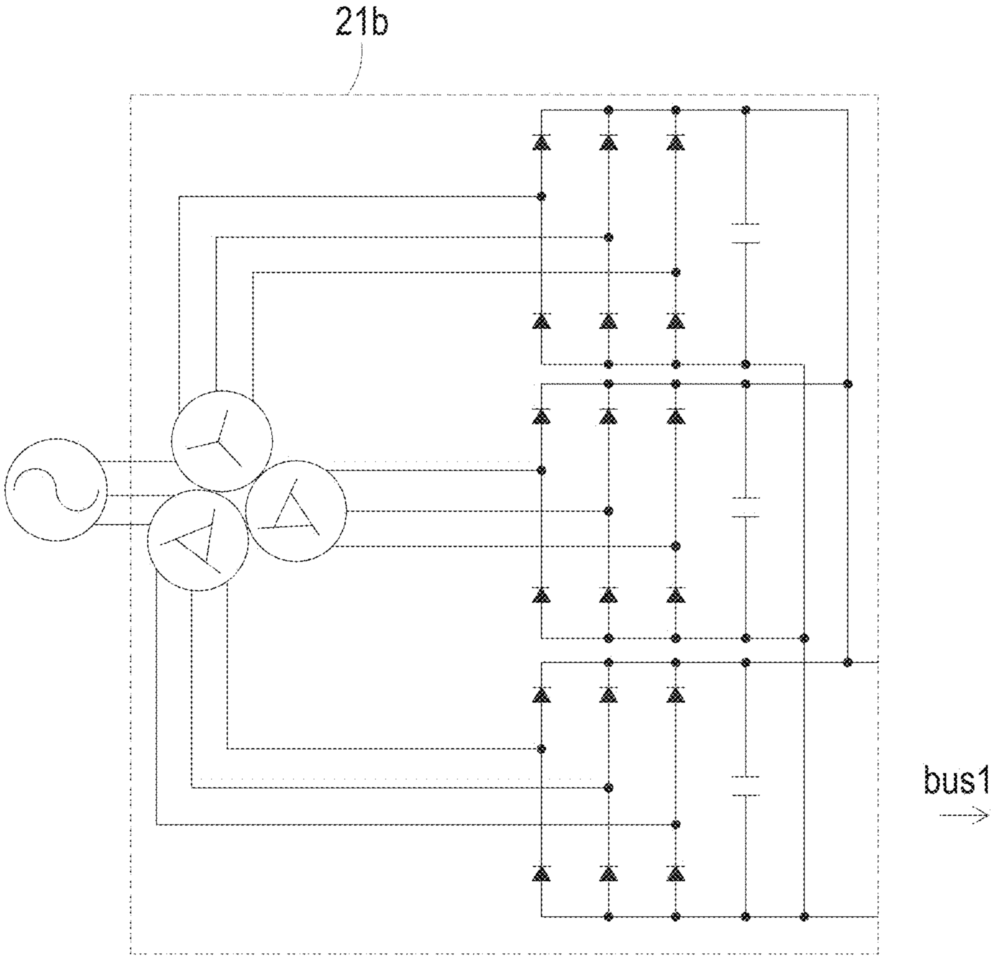
FIG. 6 is a schematic circuit diagram illustrating a second exemplary main power circuit in an isolated AC-to-DC power conversion unit of the power supply system.

FIG. 6 is a schematic circuit diagram illustrating a second exemplary main power circuit in an isolated AC-to-DC power conversion unit of the power supply system. As shown in FIG. 6, the main power circuit in the isolated AC-to-DC power conversion unit 21 has an isolated circuitry topology 21*b*. The isolated circuitry topology 21*b* includes a multi-pulse rectifier (MPR). The multi-pulse rectifier includes multiple groups of three-phase rectifier bridges. The phase difference between the input voltages of every two adjacent three-phase rectifier bridges is 360°/N, wherein N is the number of rectified pulses. In the example of FIG. 6, the multi-pulse rectifier is an 18-pulse rectifier, and the phase difference is 20° (i.e.,) 360°/18=20°. When compared with the PWM rectifier, the multi-pulse rectifier (MPR) has the advantages of simple implementation, low cost, and high reliability. Consequently, the multi-pulse rectifier (MPR) can be widely used in high-power rectifier systems.

Figure 7A:
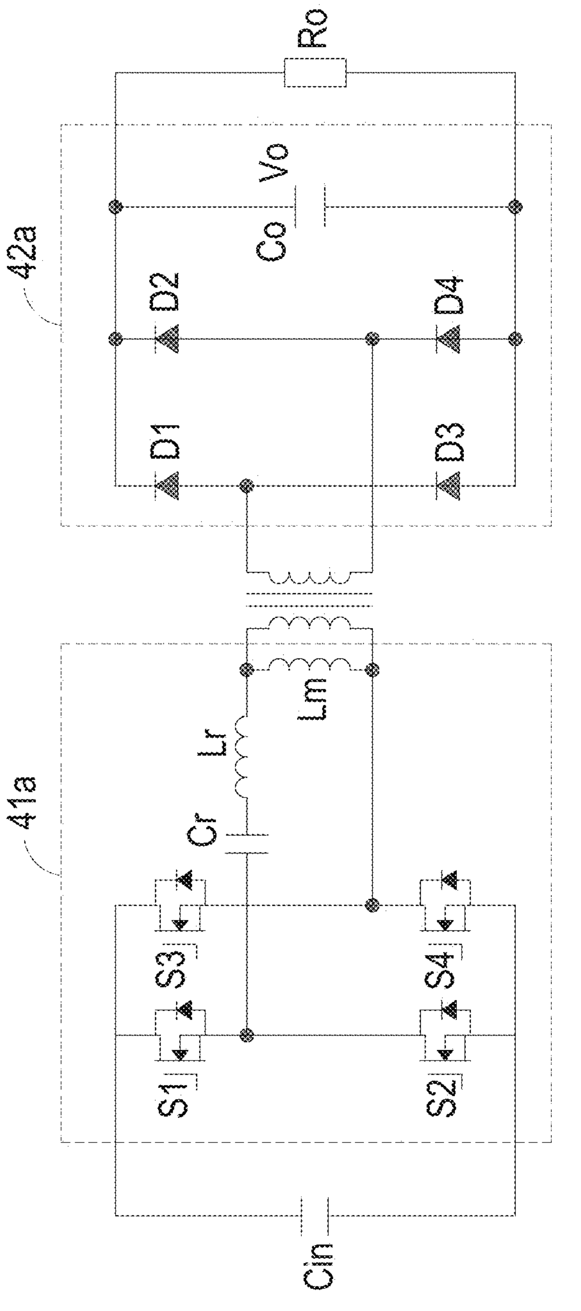
FIG. 7A is a schematic circuit diagram illustrating a first exemplary main power circuit in an isolated DC-to-DC power conversion unit of the power supply system.
Figure 7B:
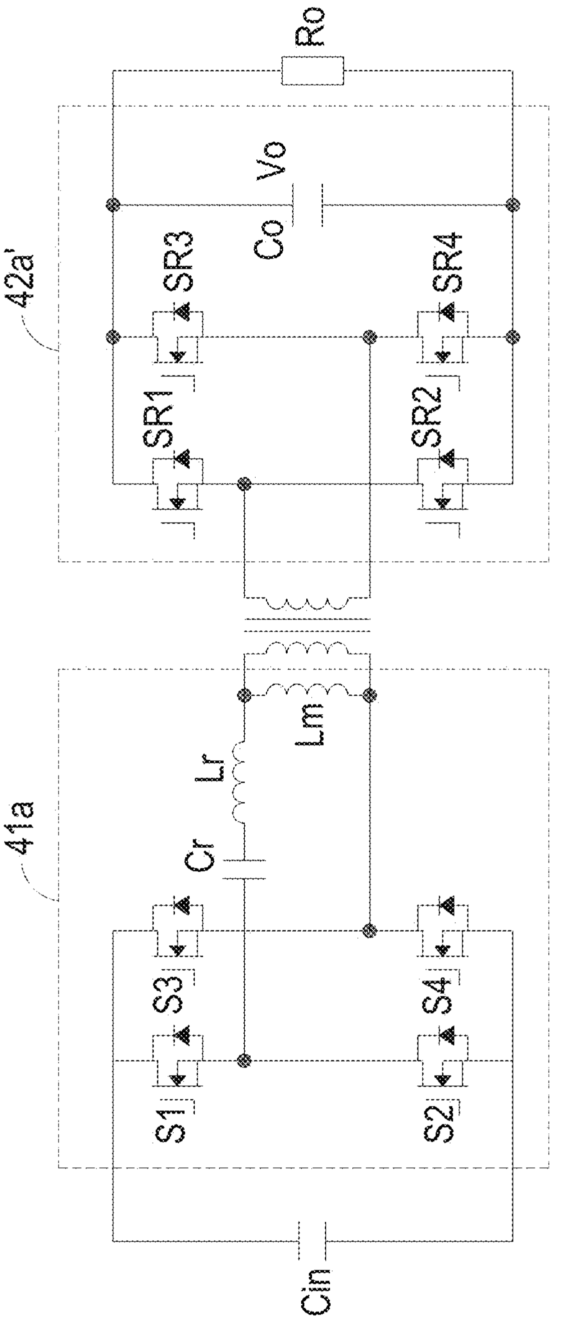
FIG. 7B is a schematic circuit diagram illustrating a second exemplary main power circuit in an isolated DC-to-DC power conversion unit of the power supply system.
Figure 7C:
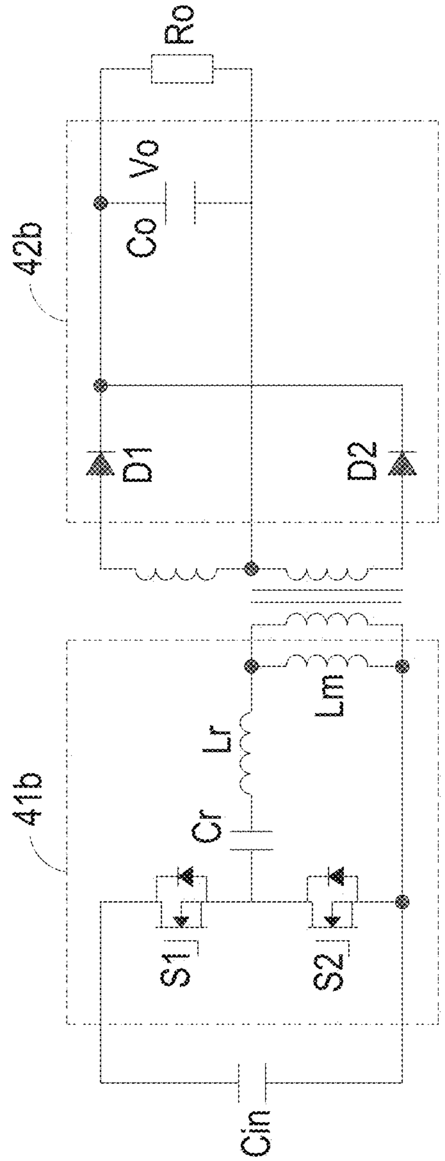
FIG. 7C is a schematic circuit diagram illustrating a third exemplary main power circuit in an isolated DC-to-DC power conversion unit of the power supply system.
Figure 7D:
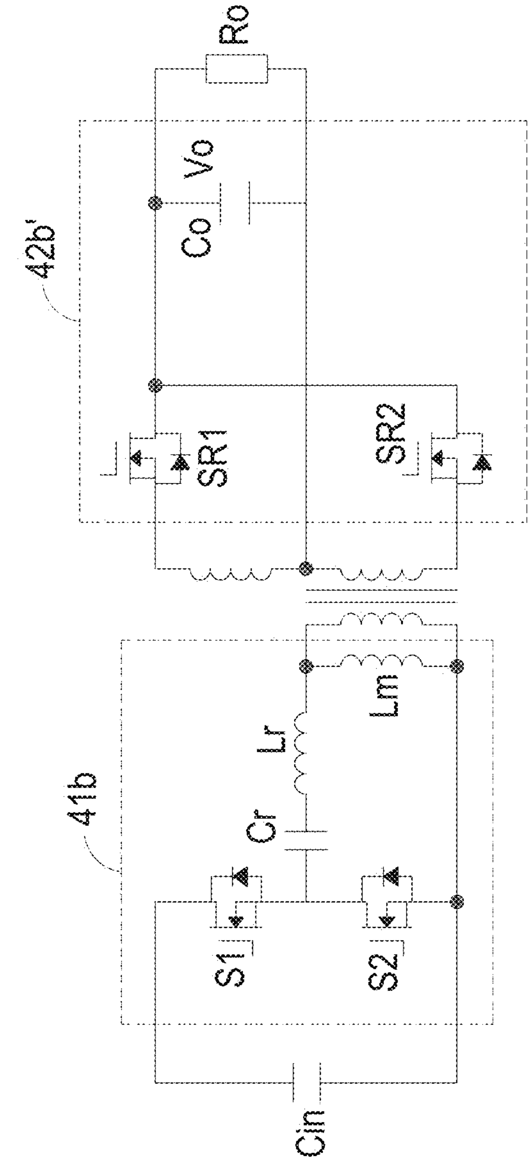
FIG. 7D is a schematic circuit diagram illustrating a fourth exemplary main power circuit in an isolated DC-to-DC power conversion unit of the power supply system.

FIG. 7A is a schematic circuit diagram illustrating a first exemplary main power circuit in an isolated DC-to-DC power conversion unit of the power supply system. FIG. 7B is a schematic circuit diagram illustrating a second exemplary main power circuit in an isolated DC-to-DC power conversion unit of the power supply system. FIG. 7C is a schematic circuit diagram illustrating a third exemplary main power circuit in an isolated DC-to-DC power conversion unit of the power supply system. FIG. 7D is a schematic circuit diagram illustrating a fourth exemplary main power circuit in an isolated DC-to-DC power conversion unit of the power supply system.

In FIG. 7A, the main power circuit of the isolated DC-to-DC power conversion unit 223 is an LLC circuit. The main power circuit of the isolated DC-to-DC power conversion unit 223 includes a primary side circuit 41*a* and a secondary side circuit 42*a*. In FIG. 7C, the main power circuit of the isolated DC-to-DC power conversion unit 223 is also an LLC circuit. The main power circuit of the isolated DC-to-DC power conversion unit 223 includes a primary side circuit 41*b* and a secondary side circuit 42*b*.

The primary side circuit includes at least one inverter circuit. The inverter circuit is a full-bridge inverter circuit or a half-bridge inverter circuit. For example, the primary side circuit 41*a* is a full-bridge inverter circuit, and the full-bridge inverter circuit includes four switches S1~S4, a resonant capacitor Cr, a resonant inductor Lr and a magnetizing inductor Lm. For example, the primary circuit 41*b* is a half-bridge inverter circuit, and the half-bridge inverter circuit includes two switches S1~S2, a resonant capacitor Cr, a resonant inductor Lr and a magnetizing inductor Lm.

The secondary side circuit includes at least one rectifier circuit. The rectifier circuit is a full-bridge rectifier circuit or a full-wave rectifier circuit. For example, the secondary side circuit 42*a* is a full-bridge rectifier circuit, and the full-bridge rectifier circuit includes four diodes D1~D4 and a filter capacitor Co. The secondary side circuit 42*b* is a full-wave rectifier circuit, and the full-wave rectifier circuit includes two diodes D1~D2 and a filter capacitor Co.

In FIG. 7A, the primary side circuit 41*a* and the secondary side circuit 42*a* are collaboratively formed as a complete LLC circuit, an output voltage Vo is generated at an output terminal of the LLC circuit, thereby providing power to the load Ro. In FIG. 7C, the primary side circuit 41*b* and the secondary side circuit 42*b* are collaboratively formed as a complete LLC circuit, an output voltage Vo is generated at an output terminal of the LLC circuit, thereby providing power to the load Ro.

In FIG. 7B, the four diodes D1~D4 of the secondary side circuit 42*a* shown in FIG. 7A are replaced by metal-oxide-semiconductor (MOS) switches SR1~SR4. The secondary side circuit 42*a*' in FIG. 7B also has a rectifying function and is capable of reducing conduction loss. In FIG. 7D, the two diodes D1~D2 of the secondary side circuit 42*b* shown in FIG. 7C are replaced by metal-oxide-semiconductor (MOS) switches SR1~SR2. The secondary side circuit 42*b*' in FIG. 7D also has a rectifying function and is capable of reducing conduction loss. In some other embodiments, the MOS switches are replaced by IGBT switches or any other appropriate switches.

Figure 8:
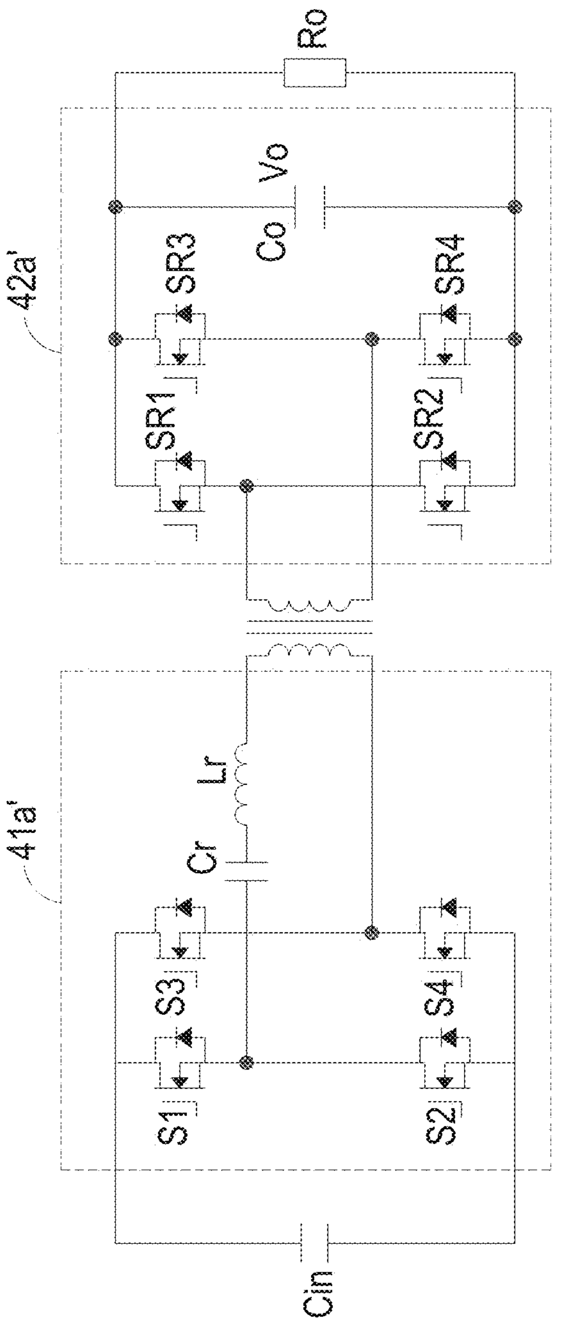
FIG. 8 is a schematic circuit diagram illustrating a fifth exemplary main power circuit in an isolated DC-to-DC power conversion unit of the power supply system.

FIG. 8 is a schematic circuit diagram illustrating a fifth exemplary main power circuit in an isolated DC-to-DC power conversion unit of the power supply system.

In FIG. 8, the main power circuit of the isolated DC-to-DC power conversion unit 223 is a boost series resonant converter (boost-SRC) circuit. The boost-SRC circuit includes a primary side circuit 41*a*' and a secondary side circuit 42*a*'. The primary side circuit 41*a*' is similar to the primary side circuit 41*a* shown in FIG. 7A or FIG. 7B, but the LLC resonant tank is changed. In the resonant tank of this embodiment, the resonant capacitor Cr and the resonant inductor Lr are connected in series for resonance. The secondary side circuit 42*a*' is a full-bridge rectifier circuit identical to the secondary side circuit 42*a*' shown in FIG. 7B as example, the secondary side circuit 42*a*' can also be a full-wave rectifier circuit identical to the secondary side circuit 42*b*' shown in FIG. 7D. Since the magnetizing inductor Lm in the inverter circuit is not necessary when the boost-SRC circuit is applied, a gapless transformer can be used to reduce the loss and increase the circuit efficiency.

In the LLC circuit shown in each of FIGS. 7A to 7D or the boost-SRC circuit shown in FIG. 8, the examples of the primary side circuit and the secondary side circuit may be modified. In some other embodiments, the primary side circuit includes multiple sets of full-bridge inverter circuits or half-bridge inverter circuits, and the secondary side circuit includes multiple sets of full-bridge rectifier circuits or full-wave rectifier circuits.

Figure 9A:
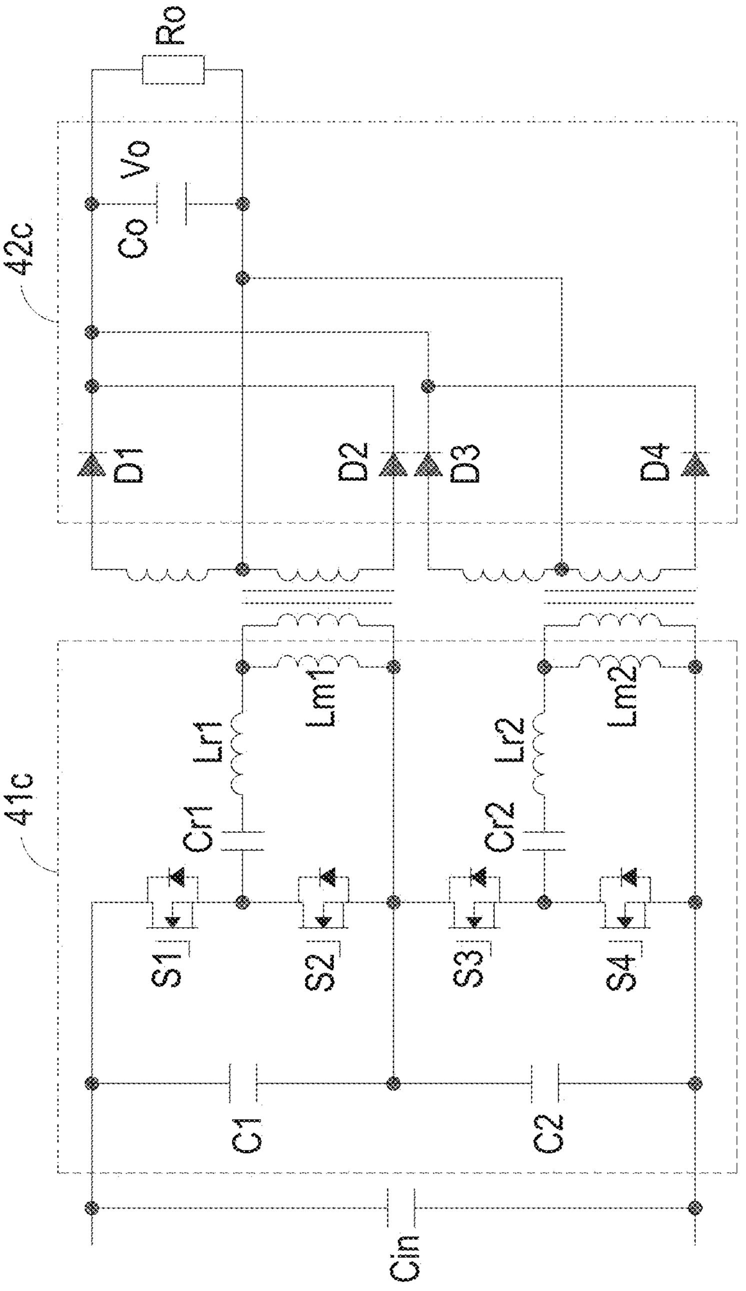
FIG. 9A is a schematic circuit diagram illustrating a sixth exemplary main power circuit in an isolated DC-to-DC power conversion unit of the power supply system.
Figure 9B:
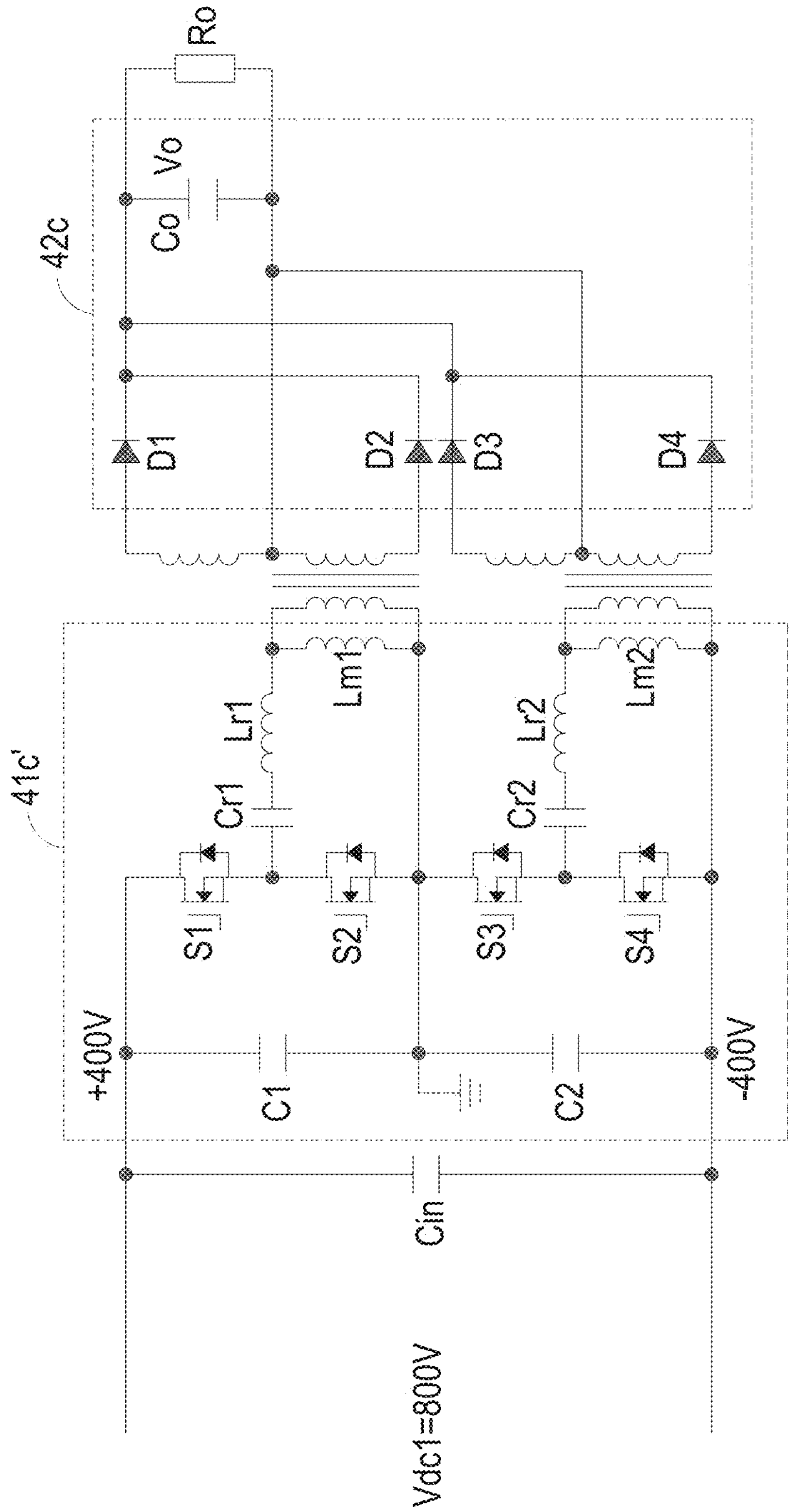
FIG. 9B is a schematic circuit diagram illustrating a seventh exemplary main power circuit in an isolated DC-to-DC power conversion unit of the power supply system.

FIG. 9A is a schematic circuit diagram illustrating a sixth exemplary main power circuit in an isolated DC-to-DC power conversion unit of the power supply system. FIG. 9B is a schematic circuit diagram illustrating a seventh exemplary main power circuit in an isolated DC-to-DC power conversion unit of the power supply system. In FIG. 9A or FIG. 9B, the main power circuit of the isolated DC-to-DC power conversion unit 223 is an LLC circuit.

In the embodiment of FIG. 9A, the primary side circuit 41*c* includes two half-bridge inverter circuits in series connection, and the secondary side circuit 42*c* includes two full-wave rectifier circuits in parallel connection. As shown in FIG. 9A, the primary side circuit 41*c* includes four switches S1~S4, two resonant capacitors Cr1, Cr2, two resonant inductors Lr1, Lr2 and two magnetizing inductors Lm1, Lm2. The secondary side circuit 42*c* includes four diodes D1~D4 and a filter capacitor Co. An output voltage Vo is generated at an output terminal of the secondary side circuit 42*c*, thereby providing power to the load Ro.

In the primary side circuit 41*c*' of the LLC circuit shown in FIG. 9B, the midpoint between the two series-connected resonant capacitors Cr1 and Cr2 is connected with a ground terminal. The first DC voltage Vdc1 of 800V between a high voltage terminal and a low voltage terminal of the first DC bus (bus1) is divided into +400V between the high voltage terminal and the ground terminal and −400V between the low voltage terminal and the ground terminal, or the first DC voltage Vdc1 of 1500V between the high voltage terminal and the low voltage terminal of the first DC bus (bus1) is divided into +750V between the high voltage terminal and the ground terminal and −750V between the low voltage terminal and the ground terminal.

Figure 9C:
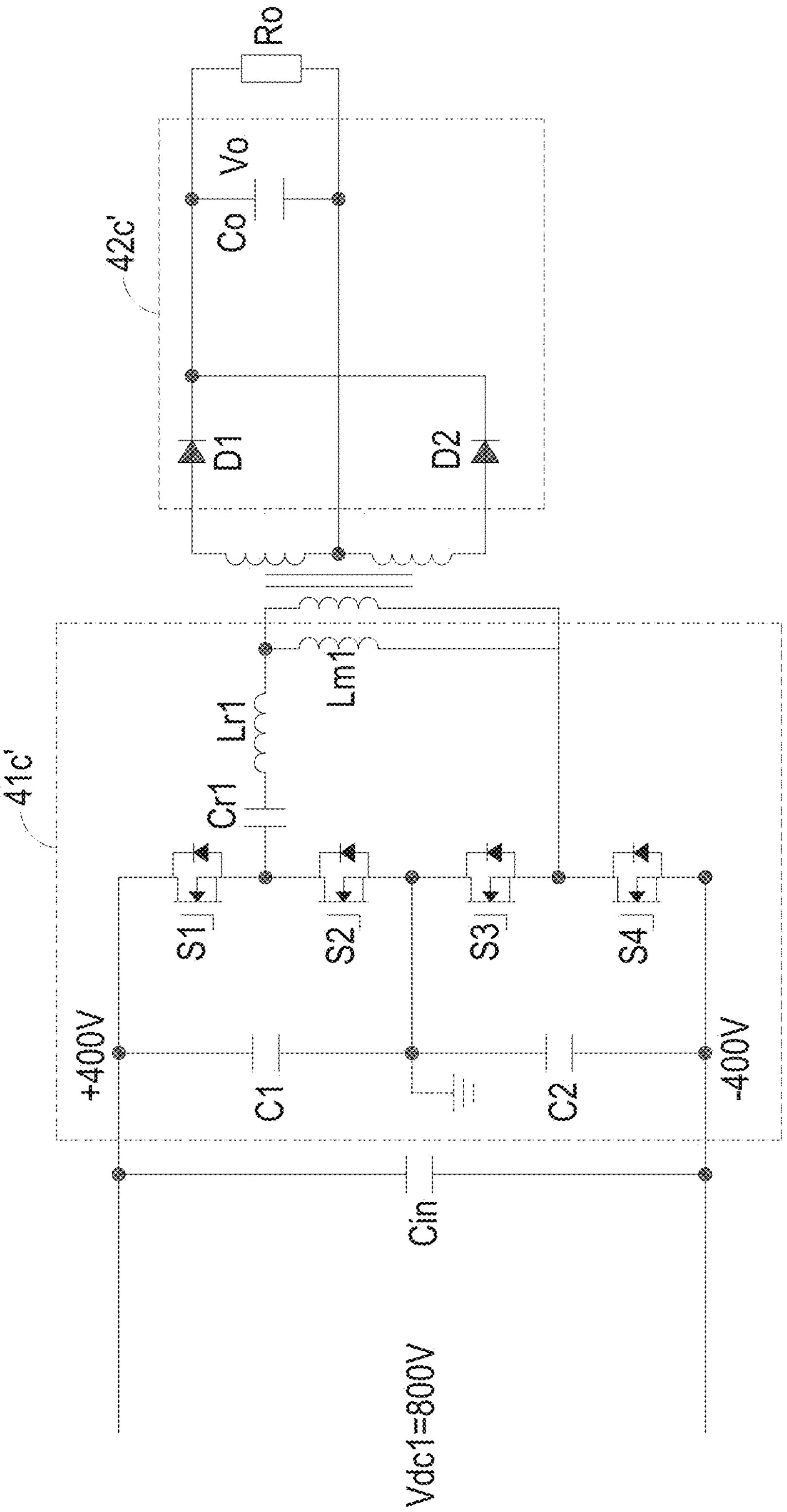
FIG. 9C is a schematic circuit diagram illustrating an eighth exemplary main power circuit in an isolated DC-to-DC power conversion unit of the power supply system.

FIG. 9C is a schematic circuit diagram illustrating an eighth exemplary main power circuit in an isolated DC-to-DC power conversion unit of the power supply system. In FIG. 9C, the LLC circuit is a series half-bridge LLC (SHB-LLC) circuit. In addition, the secondary side circuit 42*c*' can also include a single full-wave rectifier circuit.

Figure 9D:
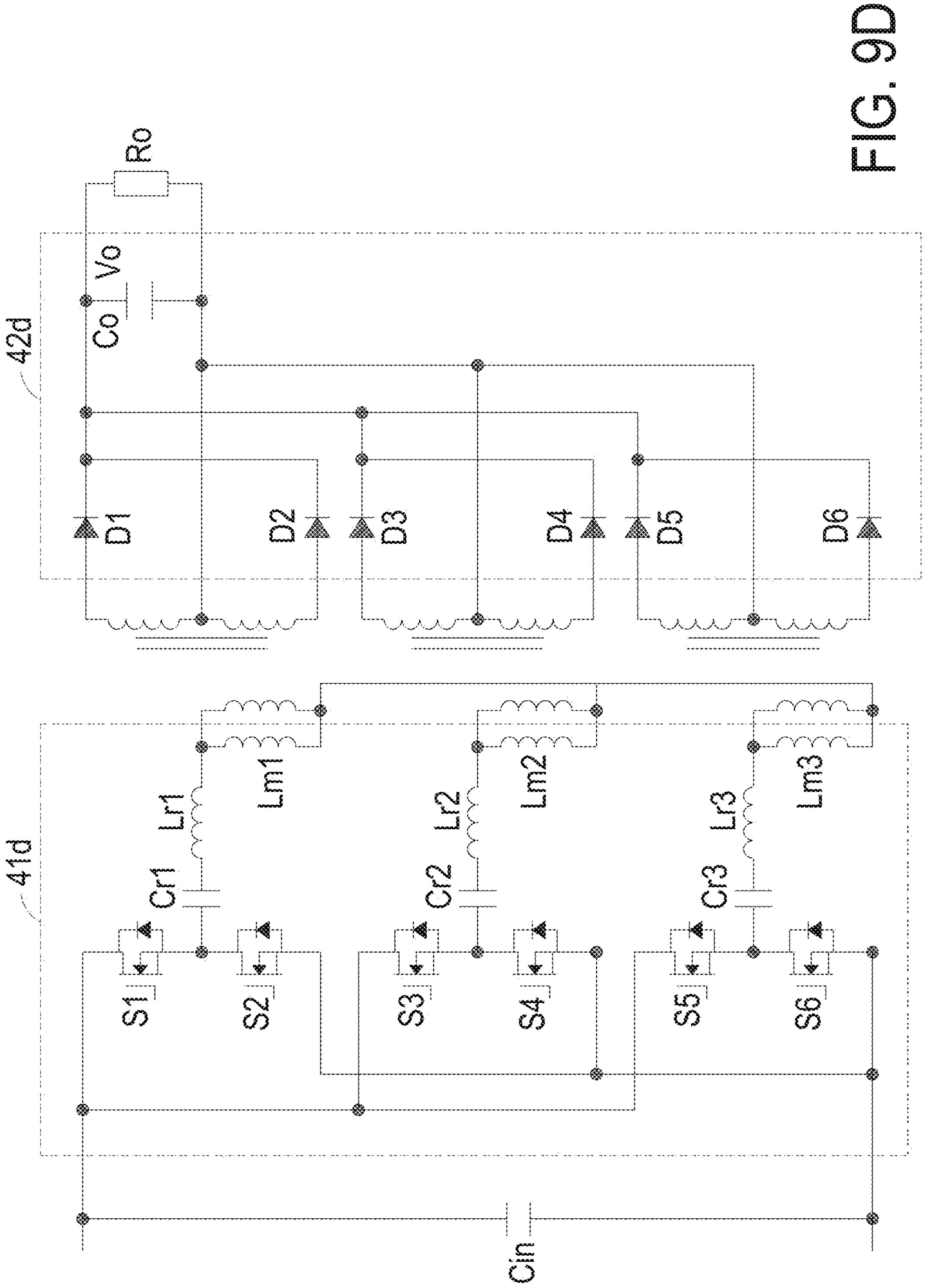
FIG. 9D is a schematic circuit diagram illustrating a ninth exemplary main power circuit in an isolated DC-to-DC power conversion unit of the power supply system.

FIG. 9D is a schematic circuit diagram illustrating a ninth exemplary main power circuit in an isolated DC-to-DC power conversion unit of the power supply system. In the embodiment of FIG. 9D, the primary side circuit 41*d* includes three half-bridge inverter circuits in interleaved parallel connection, and the secondary side circuit 42*d* includes three full-wave rectifier circuits in parallel connection. As shown in FIG. 9D, the primary side circuit 41*d* includes six switches S1~S6, three resonant capacitors Cr1~Cr3, three resonant inductors Lr1~Lr3 and three magnetizing inductors Lm1~Lm3. The secondary side circuit 42*d* includes six diodes D1~D6 and a filter capacitor Co. An output voltage Vo is generated at an output terminal of the secondary side circuit 42*c*, thereby providing power to the load Ro.

From the above descriptions, the present disclosure provides a power supply system. Since the server power supply only includes a single-stage of isolated DC-to-DC power conversion unit, the AC-to-DC converter used in the conventional server power supply can be omitted. In addition, the main power circuit of the isolated DC-to-DC power conversion unit uses an LLC circuit or a boost-SRC circuit. When the power supply system is in a normal working state, the LLC circuit or the boost-SRC circuit is controlled to work at a resonance point. Consequently, the conversion efficiency of the server power supply is greater than that of the conventional solution, and the conversion efficiency of the overall power supply system is further improved. When the system input voltage is insufficient or the load is subjected to a sudden change, the energy storage unit electrically connected to the first DC bus can respond rapidly to provide the input voltage for the server power supply. Consequently, the reliability of the power supply system is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply system, comprising:

an isolated AC-to-DC power conversion unit that converts a system input voltage into a first DC voltage, wherein the first DC voltage is provided to a first DC bus;

an isolated DC-to-DC power conversion unit electrically connected with the isolated AC-to-DC power conversion unit through the first DC bus, wherein the first DC voltage from the first DC bus is converted into a second DC voltage by the isolated DC-to-DC power conversion unit, and the second DC voltage is provided to a load, wherein a main power circuit in the isolated DC-to-DC power conversion unit is an LLC circuit or a boost-SRC circuit, and a voltage value of the second DC voltage is between 0.5V and 60V; and an energy storage unit electrically connected with the first DC bus, and comprising a battery, wherein when the isolated AC-to-DC power conversion unit works normally, the energy storage unit is charged to a floating charge state, and a voltage value of the first DC voltage is between 380V and 1500V.

2. The power supply system according to claim 1, wherein the voltage value of the first DC voltage is between 800V and 1500V.

3. The power supply system according to claim 1, wherein the voltage value of the first DC voltage is 400V, 800V or 1200V.

4. The power supply system according to claim 1, wherein the system input voltage is a medium AC voltage of at least 10 kV or a low AC voltage between 400 V and 690 V.

5. The power supply system according to claim 1, wherein the voltage value of the second DC voltage is 0.6V~2V, 5V~12V or 50V~60V.

6. The power supply system according to claim 1, wherein a primary side circuit of the LLC circuit or the boost-SRC circuit includes two resonant capacitors, wherein the two resonant capacitors are connected in series between a high voltage terminal and a low voltage terminal of the first DC bus, and a midpoint between the two resonant capacitors is connected to a ground terminal, such that the first DC voltage of 800V between the high voltage terminal and the low voltage terminal of the first DC bus is divided into +400V between the high voltage terminal and the ground terminal and −400V between the low voltage terminal and the ground terminal, or the first DC voltage of 1500V between the high voltage terminal and the low voltage terminal of the first DC bus is divided into +750V between the high voltage terminal and the ground terminal and −750V between the low voltage terminal and the ground terminal.

7. The power supply system according to claim 1, wherein the voltage value of the second DC voltage is 12V, 48V or 54V.

8. The power supply system according to claim 1, wherein the isolated AC-to-DC power conversion unit includes a cascade H-bridge rectifier circuit, a plurality of DC decoupling capacitors and a dual active full-bridge circuit.

9. The power supply system according to claim 1, wherein the isolated AC-to-DC power conversion unit includes a multi-pulse rectifier.

10. The power supply system according to claim 1, wherein the energy storage unit is electrically connected with the first DC bus through a first DC-to-DC converter.

11. The power supply system according to claim 1, wherein the energy storage unit includes a battery to store energy, wherein when the isolated AC-to-DC power conversion unit does not work normally, the energy storage unit is enabled to provide an input voltage to the isolated DC-to-DC power conversion unit.

12. The power supply system according to claim 1, wherein the power supply system further includes a second DC-to-DC converter, wherein an input terminal of the second DC-to-DC converter is electrically connected with the isolated DC-to-DC power conversion unit, and an output terminal of the second DC-to-DC converter is electrically connected with the load.

13. The power supply system according to claim 1, wherein when the power supply system works normally, the LLC circuit or the boost-SRC circuit is controlled to work at a resonance point.

14. The power supply system according to claim 1, wherein the LLC circuit or the boost-SRC circuit includes a primary side circuit and a secondary side circuit, wherein the primary side circuit includes at least one inverter circuit, and the inverter circuit is a full-bridge inverter circuit or a half-bridge inverter circuit, wherein the secondary side circuit includes at least one rectifier circuit, and the rectifier circuit is a full-bridge rectifier circuit or a full-wave rectifier circuit.

15. The power supply system according to claim 1, wherein the LLC circuit or the boost-SRC circuit includes a primary side circuit and a secondary side circuit, wherein the primary side circuit includes a plurality of inverter circuits in parallel connection, in series connection or interleaved parallel connection, and the secondary side circuit includes a plurality of rectifier circuits in parallel connection, in series connection or interleaved parallel connection.

16. The power supply system according to claim 1, wherein the power supply system further includes at least one third DC-to-DC converter, and the first DC bus is electrically connected with a fuel cell or a solar panel through the at least one third DC-to-DC converter.

17. The power supply system according to claim 1, wherein the power supply system further includes at least one AC-to-DC converter, and the first DC bus is electrically connected with a wind power generator through the at least one AC-to-DC converter.

* * * * *